March 20, 1951 — O. C. MARTIN — 2,545,526
FLUID CONTROL VALVE
Filed Sept. 17, 1945 — 5 Sheets-Sheet 1

INVENTOR.
OTIS C. MARTIN
BY
Attorney

March 20, 1951     O. C. MARTIN     2,545,526
FLUID CONTROL VALVE
Filed Sept. 17, 1945     5 Sheets-Sheet 2
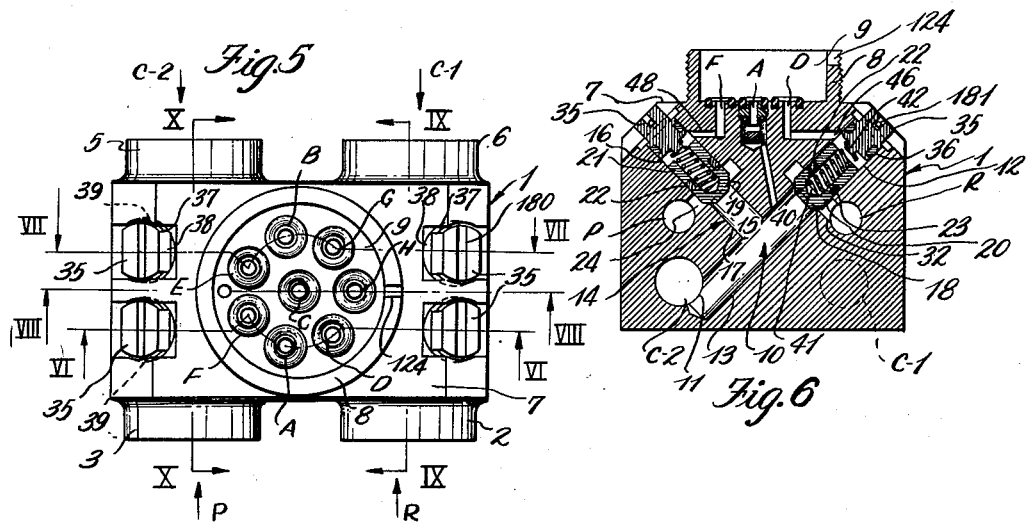
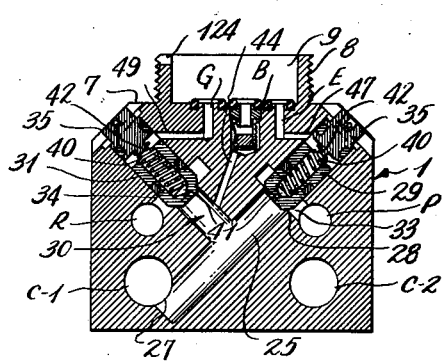
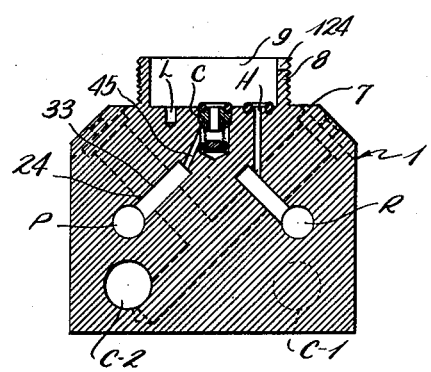
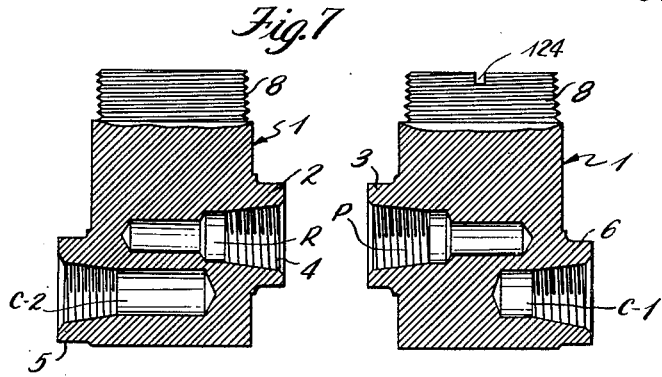
INVENTOR.
OTIS C. MARTIN
BY
Attorney

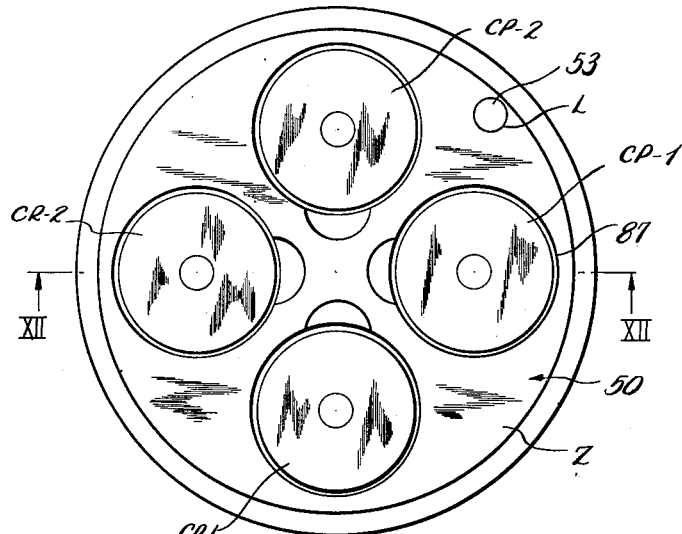
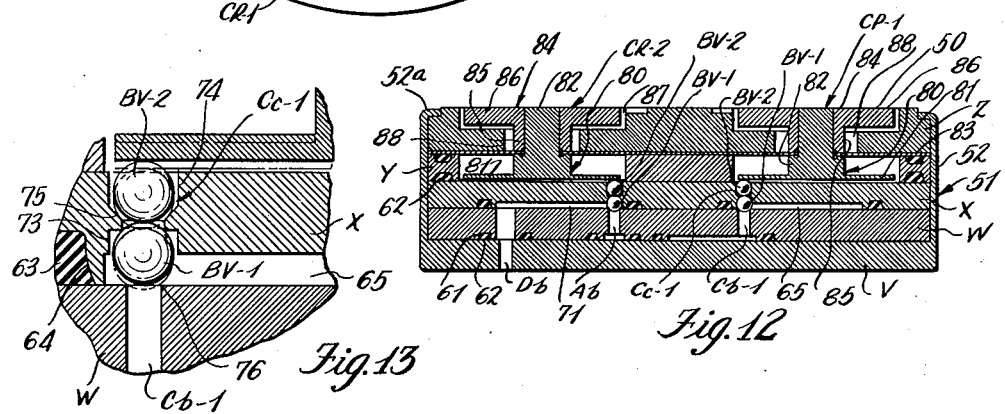
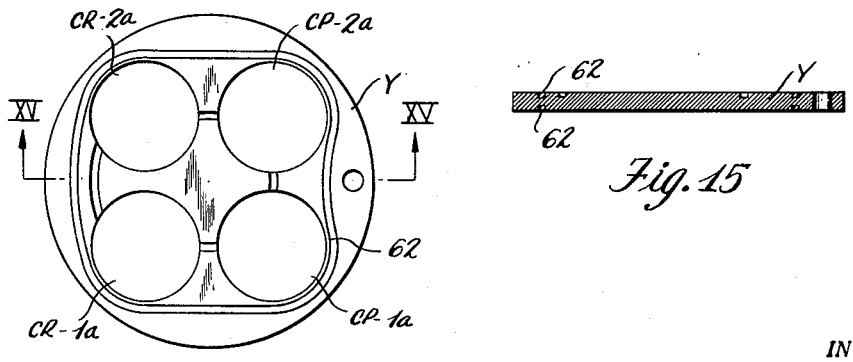

March 20, 1951     O. C. MARTIN     2,545,526
FLUID CONTROL VALVE

Filed Sept. 17, 1945     5 Sheets-Sheet 4

INVENTOR.
OTIS C. MARTIN
BY
Attorney

March 20, 1951  O. C. MARTIN  2,545,526
FLUID CONTROL VALVE

Filed Sept. 17, 1945  5 Sheets-Sheet 5

INVENTOR.
OTIS C. MARTIN
BY
Attorney

Patented Mar. 20, 1951

2,545,526

UNITED STATES PATENT OFFICE 2,545,526

FLUID CONTROL VALVE

Otis C. Martin, Los Angeles, Calif.; Marion E. Martin, administratrix of said Otis C. Martin, deceased, assignor to Harry Nock, Elizabeth, N. J.

Application September 17, 1945, Serial No. 616,672

3 Claims. (Cl. 137—144)

My invention relates to fluid control valves and has particular reference to a valve for controlling the flow of fluid in fluid systems adapted for use of either high or low fluid pressures.

In fluid systems it is the common practice to employ flow control valves for controlling the flow of fluid from a source of fluid under pressure to various pieces of apparatus to be actuated by such fluid. In many instances the space which is permitted in a particular location for the mounting of the fluid control valves is extremely limited, necessitating the use of a valve of minimum over-all dimensions. However, when such valves are required to control either fluid under relatively high pressures or to control the flow of fluid in lines requiring a great fluid flow capacity, difficulty has been encountered in providing a valve of sufficiently small dimensions to fit within the space permitted for the same.

In many other instances the weight requirement becomes a major factor. For example, on airplanes it has recently become the common practice to utilize hydraulic fluid as a power transmission fluid for the operation of many of the functions of the airplane, such as ailerons, elevators, rudders, landing gear and the like. It is fundamental that each ounce of weight required to be carried by the airplane for the operation of the functional portions of the airplane detracts from the load carrying capacity of the plane and great effort has been expended in devising hydraulic equipment which will have a minimum of weight and yet have a hydraulic power capacity sufficient to operate the necessary equipment. One expedient which has been attempted to minimize the weight requirements of the operating equipment, valves and pipe lines has been to resort to power sources of relatively high pressure ranging up to 5000 or more pounds per square inch but heretofore all of the valve structures which have been employed for the control of such fluids under such high pressures have been excessive either as to bulk or weight, or both.

It is therefore an object of my invention to provide a valve structure adapted to control the flow of fluids in fluid power systems which has a minimum of bulk and a minimum of weight.

Another object of my invention is to provide a valve structure of the character set forth, in which great fluid flow capacity is provided without requiring great bulk or great weight in the valve structure.

Another obect of my invention is to provide a valve of the character described in which the valve is fully adapted to handle fluids under pressure ranging into many thousands of pounds per square inch and yet the space and weight requirements of the valve are held to a minimum.

Another object of my invention is to provide a valve of the character described which has the capacity to handle great fluid flow and great operating pressures and in which the manipulation of the valve may be obtained with relatively few inch pounds of operating force.

Another object of my invention is to provide a valve of the character set forth in which the valve structure comprises a main valve assembly including valves adapted to be opened to provide fluid passages of relatively great flow capacity and in which the main valves are controlled by a novel pilot valve structure, requiring but a minimum of force and operation of the pilot valves.

Another object of my invention is to provide a valve structure of the character set forth in which a single valve body is adapted for various valve functions in a fluid system merely by the alteration or substitution of the pilot valve assembly.

Another object of my invention is to provide a valve structure of the character set forth in which the main valve assembly may be constructed by mass production methods as a stock valve and in which any one of a plurality of stock pilot valve assemblies may be used to obtain the particular functions of the main valve assembly.

Another object of my invention is to provide a novel pilot valve construction which is simple to manufacture and easy to repair.

Another object of my invention is to provide a valve structure of the character set forth in which the pilot valve mechanism is assembled as a sealed unit removably associated with the main valve assembly whereby repairs to the valve may be readily accomplished by the mere removal of the unit and the substitution of another unit therefor.

Another object of my invention is to provide a valve structure of the character set forth in which each of the valve parts may be constructed by mass production methods and in which working tolerances between the various parts is a negligible factor.

Another object of my invention is to provide a valve structure of the character set forth wherein the interfitting of various moving and stationary parts of the valve structure is accomplished by the use of flexible seals whereby extreme accuracy of machining of the various parts is not required.

Other objects and advantages of my invention will be apparent from a study of the following specifications, read in connection with the accompanying drawings, wherein Fig. 1 is a front elevational view of a valve embodying my invention;

Fig. 5 is a top plan view of the valve shown in Fig. 1, with the operating mechanism removed therefrom;

Fig. 6 is a transverse sectional view taken along line VI—VI of Fig. 5;

Fig. 7 is a transverse sectional view taken along line VII—VII of Fig. 5;

Fig. 8 is a transverse sectional view taken along line VIII—VIII of Fig. 5;

Fig. 9 is a vertical sectional view taken along line IX—IX of Fig. 5 during an intermediate step in the construction of the valve body shown in Fig. 5;

Fig. 10 is a vertical sectional view taken along line X—X of Fig. 5, also during an intermediate step in the construction of the valve shown in Fig. 5;

Fig. 11 is a top plan view of the pilot valve assembly employed in the operation of the valve shown in Figs. 1 through 4;

Fig. 12 is a vertical sectional view taken along line XII—XII of Fig. 11;

Fig. 13 is a fragmentary enlarged vertical sectional view of a portion of the pilot valve assembly shown in Figs. 11 and 12;

Fig. 14 is a top plan view of the next to top disk employed in the assembly of the pilot valve structure shown in Figs. 11 and 12;

Fig. 15 is a vertical sectional view taken along line XV—XV of Fig. 14;

Body construction

Figure 1:
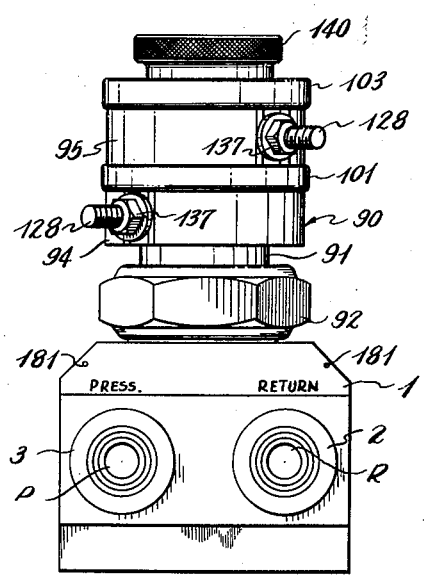
Figure 2:
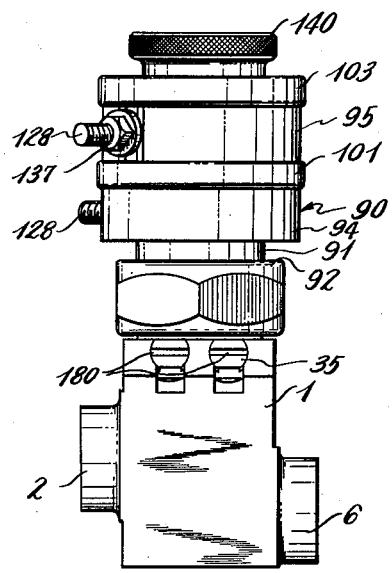
Fig. 2 is a side elevational view of the valve shown in Fig. 1.
Figure 3:
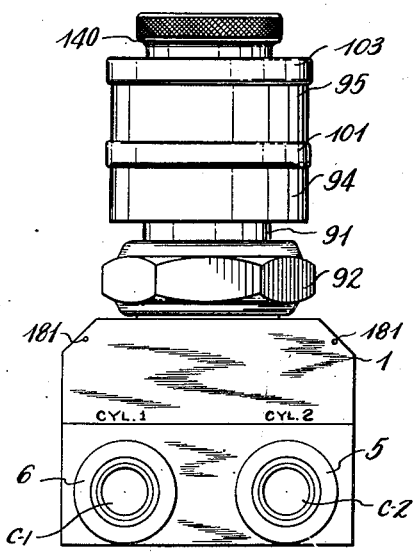
Fig. 3 is a rear elevational view of the valve shown in Fig. 1.

Referring to the drawings, I have illustrated my valve as comprising a valve body 1 comprising a block of suitable metal substantially rectangular in horizontal cross section and substantially rectangular in vertical cross section, as shown in Figs. 1 through 4, the metal employed being preferably aluminum or magnesium alloys for the purpose of minimizing the weight of the valve body.

The particular form of valve illustrated in the drawings is a typical 4-way valve adapted to control the flow of fluid to and from a double acting piston and cylinder mechanism in which it is desired to provide a neutral position in which no flow of fluid will occur, one operating position in which flow of fluid from a source of pressure will be admitted to the cylinder at one side of the piston, while fluid from the cylinder at the opposite side of the piston is passed through the valve to a return or exhaust line and a second operating position in which the flow of fluid is reversed, that is, fluid is permitted to flow from the source of pressure to the cylinder on the second mentioned side of the piston while fluid from the first mentioned side of the piston will be returned through the valve to a return or exhaust line. However, as will be apparent from the following description, the principles of my valve structure are equally adapted to other specific valve applications and the structure is not therefore limited to a 4-way valve operation.

In the form of valve shown in Figs. 1 through 4, the front face of the valve body block 1 is provided with a pair of outstanding bosses 2 and 3. Through the boss 2 extends a horizontal bore R preferably threaded adjacent its outer end as indicated at 4 for the connection thereto of a threaded pipe fitting by which the valve is connected to a pipe in the fluid system with which it is associated. The bore R is illustrated as adapted to be connected to the return or exhaust line of the fluid system. Similarly, the boss 3 is provided with a bore P adapted to be connected to a source of pressure in the fluid system.

The rear face of the body block 1 is illustrated as having projecting therefrom a pair of bosses 5 and 6 provided, respectively, with horizontally extending bores C—1 and C—2, respectively, adapted to be connected to pipe lines leading, respectively, to the first end of an operating cylinder and piston mechanism and to the other end of such cylinder and piston mechanism.

By referring particularly to Figs. 5 through 8, it will be observed that the top face 7 of the body block 1 is provided with an upstanding boss 8 counterbored as indicated at 9 (see Fig. 6) to form a receptacle into which is inserted a pilot valve assembly to be hereinafter more fully described.

Valve bores and porting

Referring to Figs. 5 through 8, it will be observed that adjacent the front face of the body block there is a valve chamber bore 10 extending angularly into the block 1 from the upper right-hand corner of the body block as viewed in Fig. 6 to intersect the cylinder port C—2 at 11. The valve bore 10 is formed with a large diameter portion 12 adjacent the upper end of the block 1 and with a reduced diameter portion 13 adjacent its intersection with the cylinder port C—2.

It will also be observed that another valve chamber bore 14 extends in the same vertical plane as the bore 10 but from the upper left-hand corner of the body block 1 to intersect the bore 10 at 15. The bore 14, like the bore 10, includes an upper portion 16 of a larger diameter than the diameter of the lower portion 17 thereof. The junctions between the larger and smaller diameter portions of the valve bores 10 and 14 comprise seats as indicated at 18 and 19, respectively, in the valve bores 10 and 14, against which seats and seals movable valve members 20 and 21 in the bores 10 and 14, respectively.

The movable valve members 20 and 21 are identical in construction and comprise a cylindrical block of metal, the lower end of which is beveled as shown in Fig. 6 to form a beveled seating surface adapted to seat and seal upon the valve seats 18 and 19, there being an annular groove 22 formed about the cylindrical surface of the movable valve members, within which is located an O-ring or doughnut seal 23 to prevent leakage of fluid between the movable valve member 20 and the upper portion 12 of the bore 10 within which the valve member 20 is adapted to move and without imposing undue resistance to the free movement of the valve member 20 toward and away from its seat 18. The valve member 21 and, in fact, as will be apparent from an inspection of Figs. 6 and 7, all of the main movable valve members, are identical in construction, each being provided with the groove and sealing ring corresponding to the groove 22 and sealing ring 23.

Referring particularly to Figs. 6, it will be observed that immediately above the valve seat 19 there is a circumferential enlargement 24 of the bore 14 sufficient to intersect pressure port P so that when the movable valve member 21 is lifted from its seat 19 the fluid passage is provided intercommunicating the pressure port P with the cylinder port C—2, permitting fluid to flow from the source of pressure to that side of the operating cylinder with which the port C—2 is connected.

By referring particularly to Fig. 7, it will be observed that a valve chamber bore 25 extends from the upper right-hand corner of the body block 1, as viewed in Fig. 7 (the corner adjacent the cylinder port C—2 as viewed in Fig. 5), the bore 25 extending through the body block 1 at such angle that it intersects the cylinder port C—1 at 27. The valve chamber bore 25, by virtue of its being formed of two different diameters, provides a valve seat 28 against which a main valve member 29 is adapted to seat. A fourth valve chamber bore 30 extends from the opposite upper corner of the body block 1 to intersect the bore 25 in which is located the fourth movable valve member 31.

While the particular angles at which the valve chamber bores 10, 14, 25 and 30 extend are not critical, I find that a block 1 can be maintained at a minimum bulk by extending the valve chamber bores at approximately 45° relative to the base or bottom of the block and it will be noted that each of the valve chamber bores, being straight circular cross section bores, may be readily formed either by a turning operation on a lathe or by a drilling operation, thus simplifying the machining operations necessary to form the valve chamber bores and the porting necessary to intercommunicate the valve chamber bores with the pressure port and return port. A simple machining operation performed either upon a lathe or drill press may be employed to provide the circumferential enlargements of the valve chamber bores necessary to intercommunicate them with the cylinder bores C—1 and C—2, respectively.

The valve bore 10 intercommunicates with the pressure port R by way of the enlargement 32, the valve chamber bore 25 intercommunicating with the pressure port P by way of the enlargement 33, and the valve chamber bore 30 intercommunicating with the return port R by way of an enlargement 34. Thus all of the machining operations which are required to be performed on the body block 1 comprises either drilling operations or turning operations necessary to provide the pressure port P, the return port R, the cylinder ports C—1 and C—2 and the various valve chamber bores described.

At this point it should be noted that the assembly of the various main movable valve members 20, 21, 29 and 31 may be readily accomplished by inserting the valve members into their respective valve chamber bores where they are retained by means of plug members 35, each of which preferably comprises a cylindrical plug insertable into the enlarged portion of the valve chamber bore and having an O-ring seal 36 extending about the same to form a fluid tight seal with the adjacent walls of the valve chamber bore. The plug 35 is provided with a radially extending flange 37, a portion of which on opposite sides of the plug is cut away as indicated at 38 to permit its insertion into a milled square opening formed in the milled rectangular slot formed in the body block at the outer end of the valve chamber bore, the sides of the slot being under-cut as indicated at 39 to receive the flange 38 when a 90° turn is given to the plug 35 after its insertion into the valve chamber bore.

In the form of valve illustrated in Figs. 1 through 8, the main movable valve members are all adapted to be normally seated or "closed" in the neutral position of the valve and I prefer to urge each of these valves toward its seated relation by means of a compression spring 40 which may comprise a short length of helical spring, one end of which is received within a counter-bore 41 extending from the upper end of the movable valve member, the opposite end of the spring 40 being preferably engaged about a protruding boss 42 formed upon the under side of the plug 35.

Since the main movable valve members are adapted to be actuated as a result of a pilot valve operation, I intercommunicate the various main valve chambers with the pilot valve socket 9 by means of suitable ports.

By referring particularly to Fig. 5, it will be observed that the bottom of the pilot valve socket 9 is formed with a plurality of vertically extending port bores A, B, C, D, E, F, G and H. The port A communicates with the cylinder port C—2 by way of a small bore 43, which intersects the valve chamber bore 10. The port B is in constant communication with the cylinder port C—1 by way of a small bore 44 which intersects the valve chamber bore 30 below the movable valve member 31.

The port C is in constant communication with the pressure port P by way of a small bore 45 (see Fig. 8) which intercommunicates with the intersecting enlargements 24 and 33 of the valve chamber bores 14 and 25, respectively, the point of communication being thus above the valve seats 18 and 28 of these valve chamber bores.

The port H is in constant communication with the cylinder port C—1, the port H communicating with the intersecting enlargements 32 and 34 of the valve chamber bores 10 and 30, respectively. Again the point of communication between the port H and the valve bores 10 and 30 is made above the valve seats in these valve chamber bores 10 and 30.

The port D is in constant communication with the valve chamber bore 10 by way of a small port 46 at a point above the main movable valve 12 in that bore; port E is constantly in communication with the valve chamber bore 25 by way of a small port 47 at a point above the main valve member 29 therein; the port F is in constant communication with the valve chamber bore 14 by way of a small port 48 at a point above the main valve member 21 therein; and the port G is in constant communication with the valve chamber bore 30 by way of a small port 49 at a point above the main valve 31 therein.

Since all of the ports A, B, C, D, E, F, G and H are vertical bores, they may be readily drilled into the body block 1 by either a simple drill press or lathe operation. The interconnecting ports or bores 43, 44, 45, 46, 47, 48 and 49 are likewise straight drilled bores which may be readily machined as shown in the drawings by a simple drilling operation.

Pilot valve

With the structure thus far described it will be apparent that when the valve is in its neutral or off position all that is necessary is to supply pressure from the fluid source above each of the main valve members, the effect of such pressure being to force the main valve members tightly upon their respective seats and to prevent the flow of any fluid through the system. To accomplish this, it is necessary therefore that pressure from the fluid source be supplied through the pilot valve structure in such manner as to expose the source of pressure to the upper end of each of the main valve members.

It will also be apparent that when it is desired to move the piston in the cylinder mechanism in one direction, it is necessary to open one of the main valve members intercommunicating the source of pressure with one of the cylinder ports, for example, C—1, and simultaneously open one of the main valve members to allow fluid to flow from the other end of the cylinder through cylinder port C—2 and back to the return or exhaust line. Hence the pilot valve structure when operated to cause movement of the cylinder and piston mechanism in this one direction should exhaust fluid from the upper ends of the main valve members 20 and 29. During this operation it is necessary to maintain fluid pressure from the source above the main valve members 21 and 31. When the opposite operation of the piston and cylinder mechanism is desired, it is necessary for the pilot valve structure to exhaust the pressure fluid from above the main valve members 21 and 31 while holding pressure above the main valve members 20 and 29.

This result is readily accomplished by means of the pilot valve assembly illustrated particularly in Figs. 11 through 21, which comprises a pilot valve assembly unit 50 comprising a cup-like case 51 having a bottom wall V and cylindrical side walls 52. Within the case 51 is assembled one upon the other a plurality of disks which may be identified as W, X, Y and Z, respectively. In the pilot valve assembly the bottom wall V of the case 51 comprises the lowermost of the pilot valve elements and is adapted to be received in the pilot valve socket 9 in such fashion as to align a plurality of vertical bores extending therethrough with the respective ports A, B, C, D, E, F, G and H. These bores may be identified, respectively, by the reference characters Aa, Ba, Ca, Da, Ea, Fa, Ga and Ha, and so disposed about the bottom V as to be alignable, respectively, with the ports A, B, C, D, E, F, G and H when a locating pin 53 extending through a locating bore La in the case 51 is located in a locating bore L formed in the bottom of the pilot valve receiving socket 9.

Figure 16:
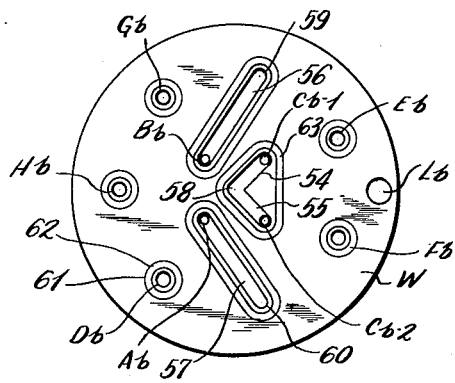
Fig. 16 is a bottom plan view of the lowermost disk of the valve assembly shown in Figs. 11 and 12.
Figure 17:
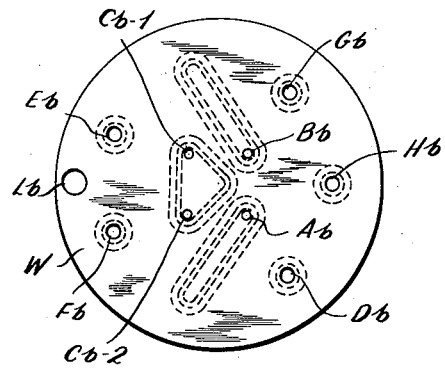
Fig. 17 is a top plan view of the disk shown in Fig. 16.

The next uppermost plate or disk W in the valve assembly is illustrated in Figs. 16 and 17 as having formed therethrough a plurality of ports Eb, Gb, Hb, Db and Fb, respectively alignable with the bores Ea, Ga, Ha, Da and Fa in the bottom V of the case. In addition thereto, the under surface of the disk W is formed with elongated depressions 54, 55, 56 and 57. The depressions 54 and 55 extend at such angle to each other as to intersect at 58 immediately above the central port Ca through the bottom V of the case. The depression 56 extends across the under surface of the disk W at such angle as to have one of its ends 59 immediately above the bore Ba in the bottom V while the opposite of its ends communicates with an auxiliary bore Bb which extends through the plate W. The depression 57 similarly extends from a point 60 above the port A to an auxiliary bore Ab which extends upwardly through the plate W.

At this point it should be noted that surrounding each of the bores Eb, Gb, Hb, Db and Fb is an annular depression 61, within which is located a seal 62 adapted to make sealing contact with the upper surface of the bottom V of the case 51, to effectively seal the aligned bores against the escape of fluid between the bottom V and the disk W. Similarly, the elongated depressions 54—57 are each surrounded by encircling depressions containing seals such as indicated at 63.

By referring particularly to Figs. 12 and 13, it will be observed that the seals 62 and 63 may be formed of suitable sealing material such as synthetic rubber molded directly into the seal-receiving depressions in the disk W, the depressions having side walls flaring outwardly adjacent the surface of the disk as indicated particularly at 64 in Fig. 13. By merely coating the disk with a coat of sealing material, the disk may be pressed by suitable pressure against any suitable flat surface and while so pressed heat applied to the disk will cure the sealing material in place therein, the excess sealing material over the surface of the disk other than at the depressions being squeezed out, leaving the depressions filled with the sealing material. When such seals are exposed to the fluid in the system, there appears to be a tendency for the adherence between the seal 62 and the wall 64 of the depression to separate, the sealing material bulging out under the effect of the fluid pressure to tightly engage the adjacent surface of the next element in the pilot valve disk assembly and prevent the passage of fluid between the meeting surfaces of the disk assemblies. However, until exposed to the fluid pressure, the natural adherence of the sealing material will be sufficient to hold the seals in place within the depressions, thus facilitating the assembly of the various elements of the pilot valve without fear of loss of the seals.

Figure 18:
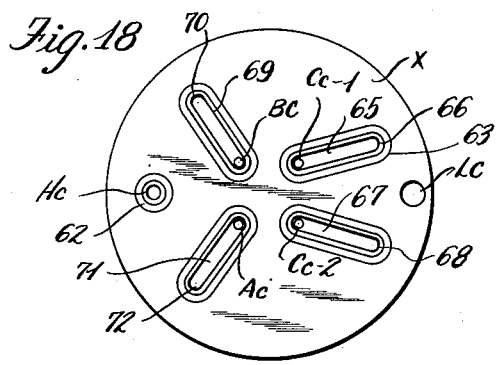
Fig. 18 is a bottom plan view of the next lowermost disk in the pilot valve assembly shown in Figs. 11 and 12.
Figure 19:
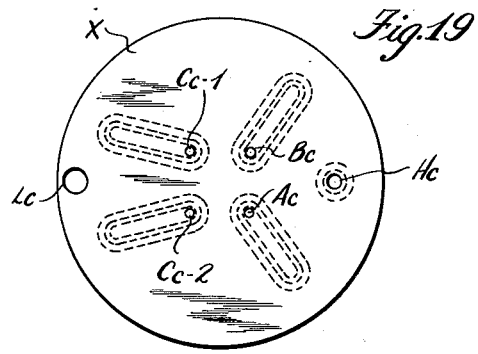
Fig. 19 is a top plan view of the disk shown in Fig. 18.
Figure 21:
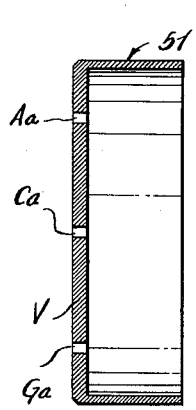
Fig. 21 is a sectional view of the housing shown in Fig. 20, taken along line XXI—XXI of Fig. 20.
Figure 20:
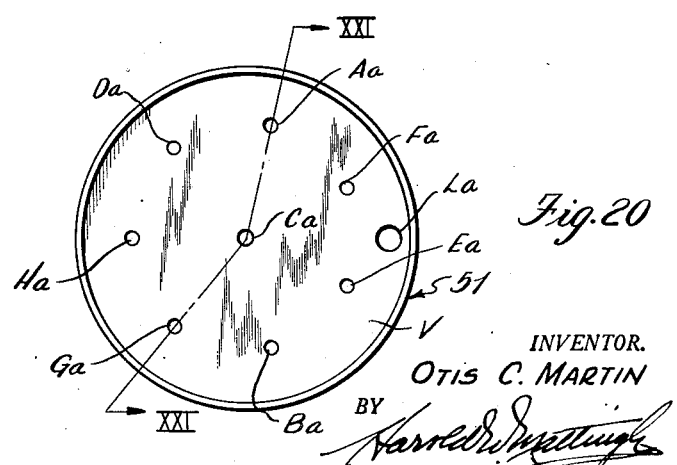
Fig. 20 is a top plan view of a cup-like housing forming a part of the valve assembly shown in Figs. 11 and 12.

The next uppermost disk X is illustrated particularly in Figs. 18 and 19 as having a locating bore Lc adapted to receive the locating pin 53 and thus align auxiliary bores Cc—1 and Cc—2 with the bores Cb—1 and Cb—2 in the disk W upon which the disk X rests. Similarly, bores Bc and Ac will be aligned with the bores Bb and Ab, respectively, in the disk W. A bore Hc will likewise be aligned with the bore Hb extending through the disk W. The bore Hc is surrounded by a seal 62 similar to the seals described with reference to the disk W while the under surface of the disk X is provided with elongated depressions, one of which indicated at 65 extends from the bore Cc—1 into alignment at 66 with the bore Eb through the disk W; another of which indicated at 67 extends from the bore Cc—2 into alignment at 68 with the bore Fb in the plate W; another of which indicated at 69 extends from alignment with the bore Bc to a point 70 alignable with the bore Gb in the plate W; while the final one indicated at 71 extends from alignment with the bore Ac to a point 72 alignable with the bore Bb in the plate W. Each of the elongated depressions is surrounded by a suitable seal 63 corresponding to the seals 63 described with reference to the disk W.

In the form of pilot valve structure illustrated in Figs. 11 through 20, it will be noted that the bores Cb—1 and Ab through the disk W are of a diameter less than the diameter of a ball valve BV—1 and it will be further noted that the bore Cc—1 is formed upon three diameters (see Fig. 13), the lowermost portion 73 of which is formed upon a diameter greater than the ball valve BV—1, the upper portion 74 being formed upon a diameter in excess of the diameter of a second ball valve BV—2, while the intermediate portion 75 is formed on a diameter smaller than the diameter of either of the ball valves BV—1 and BV—2.

Thus when the ball valves BV—1 and BV—2 are in their uppermost or full line positions, as shown in Fig. 13, the ball valve BV—1 will rest against a seat formed by the junction of the smaller and larger diameter portions 75 and 73 of the bore Cc—1 while at the same time the ball valve BV—1 will be spaced away from the seat 76 at the upper end of the bore Cb—1. The thickness of the disk X is somewhat less than twice the diameter of the ball valves BV—1 and BV—2 and the depth of the bore portions 73 and 74 is such that when the ball valves BV—1 and BV—2 are assembled as indicated in Figs. 12 and 13 the balls will rest one upon the other. Thus fluid pressure entering upwardly through the bore Cb—1 will force the ball valve BV—1 upwardly into seating relation with its uppermost seat.

Similarly, ball valve assemblies located in the disk X in the bores Cc—2, Ac and Bc will be held in their elevated or neutral positions by fluid pressure exerted upwardly through these respective bores.

It will be recalled that the port C through the bottom of the pilot valve receiving socket 9 is permanently connected by the small bore 45 to the incoming pressure from the pressure port P and hence pressure from the source will be supplied through the port C and through the aligned port Ca in the bottom V of the pilot valve case 51. Thence the pressure will be distributed through the grooves 54 and 55, respectively, to the ports Cb—1 and Cb—2 in the lowermost disk W of the pilot valve assembly.

The incoming pressure will therefore impinge upon the lowermost ball valves BV—1 in each of the ports Cb—1 and Cb—2, holding these ball valves upwardly against their respective seats 75, and away from their respective seats 76. Thus the fluid pressure entering through the port Cb—1 will be distributed through the grooves 65 and 67, respectively, which, it will be recalled, overlap the ports Eb and Fb, respectively, and through which the pressure fluid will pass downwardly through these latter ports in the disk W and through the ports E and F to supply fluid pressure above the valve members 21 and 29, respectively.

At the same time it will be observed that the ports D and G communicating respectively with the upper ends of the other main valves 20 and 31 allow any back pressure from the cylinder ports C—1 and C—2 to be exerted above the valves 20 and 31, respectively.

It will be recalled that the port A is aligned with the port Aa in the bottom V of the pilot valve case 51 which will be aligned with the end 60 of the groove 57 in the lower surface of the lower plate W and that the opposite end of this groove is aligned with the port Ab in the lower disk W so that any back pressure existing in the port C—2 such as would be occasioned by a tendency of the piston of the power cylinder attempting to creep in one direction will impinge upon the ball valve BV—1 located in the port Ab and will cause this ball valve BV—1 to rise from its seat, permitting the fluid from the cylinder port C—2 to flow through the groove 71 in the plate X, the end 72 of the groove 71 being aligned with the port D in the pilot valve socket which communicates through the small bore 46 to the upper surface of the main valve member 20. Thus this valve 20 would be held closed against the leakage of fluid from the cylinder back to the return port R.

At the same time the port B is exposed to the back pressure from the cylinder which may pass through cylinder port C—1 and any tendency for the main power cylinder to creep in the direction controlled through the port C—1 will cause such back pressure to be exerted through the port B, the port Ba in the lower wall V of the pilot valve casing 51 through the groove 56 in the lower plate W of the pilot valve assembly to the port Bb therein, thus exerting a pressure on the ball valve BV—1 which is in the port Bb to hold the ball valve from its seat and permitting such back pressure to pass through the groove 69 in the disk X and thence by way of the end 70 of that groove and back down through the port Gb in the disk W and the port G to exert such back pressure upon the upper side of the main valve 31, thus preventing the escape of any fluid from the cylinder through the cylinder port C—1 back to the return port R.

At this point attention is called to the fact that the piston in the power cylinder is positively held in that position to which it has been moved by any previous functioning of my valve and the load supported by the piston in any such position will cause a back pressure to be exerted upon the valves controlling the connection of the power cylinder to the return or exhaust port in such fashion as to prevent inadvertent escape of the fluid from the main power cylinder and to positively hold the power cylinder in such position.

Assuming that it is desired to move the main power piston in one direction, all that is necessary is to so operate the pilot valve assembly as to discharge the pressure fluid from the pressure source from above one of the main valves such as 21 or 29 and at the same time relieve the back pressure from above the opposite main valves 20 and 31.

Assuming that it is desired to operate the main power piston in the direction in which it should move were pressure from the pressure supply line supplied through the cylinder port C—1, this result may be accomplished by the operation of the ball valves in the ports Cb—1 and Ab, as viewed in Fig. 12.

By referring particularly to Figs. 11, 12 and 13, it will be observed that in the pilot valve assembly the disk Y which is disposed immediately above the disk X is provided with four openings CP—1a, CP—2a, CR—1a and CR—2a distributed symmetrically about the center of the disk Y and into each of which projects an operating button CP—1, CP—2, CR—1 and CR—2, respectively, each of the buttons overlying one of the ball valve assemblies BV—1 and BV—2 disposed in the ports Cb—2, Cb—1, Bb and Ab, respectively. Each of the buttons is constructed, as shown particularly in Fig. 12, of a lower button member 80 which comprises a disk-like head 81 having a stem 82 which extends upwardly through a thin large diameter disk 83 while the upper button member 84 comprises a hollow stem 85 adapted to be telescopically received upon the stem 82 and is also provided with a radially extending disk-like flange 86.

The uppermost disk Z of the pilot valve assembly, as viewed in Fig. 11, includes a relatively large diameter bore 87 for each of the buttons CP—1, CP—2, etc., into which the upper flanges 86 of these buttons are received, the disk Z being provided with a counterbore 88 for each of the buttons through which the telescoped stems of the button assemblies may pass.

By referring particularly to Fig. 12, it will be observed that the large diameter disk 83 is relatively thin and is preferably formed of resilient material to which each of the buttons is attached by disposing the disk 83 between the telescoped stems of the buttons. Thus the inherent resilience of the material of the disk 83 will cause all of the buttons to be disposed in the positions shown in Fig. 12 with the lower flange 81 of each of the buttons barely resting upon the uppermost ball valves BV—2 of each of the ball valve assemblies. However, upon depressing the buttons CP—1, CP—2, etc., the lower flanges 81 of each of these buttons so depressed will depress the ball valve assemblies BV—1 and BV—2.

In assembling the pilot valve disks, the disk Y will be placed upon the disk X where it will make sealing contact by reason of a strip of sealing material 62 (similar to the strips of sealing material 62 described with reference to the disk W) which extends about the under surface of the disk Y. A similar strip of sealing material 62 extends about the upper surface of the disk Y and seals the upper surface of the disk against the resilient disk 83. The entire pilot valve assembly as described herein is then sealed together by means of rolling over the upper edge of the side wall 52 of the pilot valve case 51 as indicated at 52a in Fig. 12.

Assuming that pressure from the pressure source is to be supplied from one end of the power cylinder through the cylinder bore C—1, the button CP—1 should be depressed at the same time that button CR—2 is depressed to operate the ball valve assembly disposed immediately beneath these buttons.

The depression of the button CP—1 will move the ball valve assembly associated therewith downwardly to cause the ball valve BV—1 to close off against its seat 76 and prevent the passage of pressure fluid from the pressure source to the upper end of the piston 29, as previously traced. At the same time the depression of the ball valve BV—1 will open a fluid passage through the groove 65 and the port Cc—1 to permit the fluid which has been disposed above the piston 29 to escape to the return port R above the valve BV—1 and through the port Cc—1 to the space above the disk X.

By referring particularly to Figs. 5, 8 and 14 through 20, it will be observed that the port H which communicates with the return port R also communicates through the pilot valve assembly with the upper surface of the pilot valve disk X through aligned ports Ha, Hb and Hc in the bottom V of the pilot valve casing 51, the disk W and the disk X, respectively. Thus the fluid which passes the ball valve BV—1 may flow to the return port about the ball valve BV—2 and the main valve 29 will be forced from its seat 28 by the effect of the pressure fluid entering through the pressure port P.

With the main valve 29 lifted from its seat, pressure from the fluid source is supplied through the pressure port P of the valve chamber bore 25 to the port C—1 and thence to one end of the power cylinder to cause the piston therein to move in one direction.

At the same time the button CP—1 was depressed, the button CR—2 was also depressed, causing the ball valve assembly BV—1 and BV—2 disposed beneath the button CR—2 to be moved from its normal operative position and in so doing the ball valve BV—1 associated therewith will be closed against its lower seat. The back pressure from the cylinder port C—2 is therefore prevented from exerting further pressure through the port D upon the upper end of the main valve 20 and any pressure which had previously been exerted upon the upper end of the valve 20 is permitted to exhaust past the ball valve BV—2 to the space above the disk X and thence to the return line through the aligned ports H, Ha, Hb and Hc as hereinbefore described. Thus the valve 20 is forced upwardly from its seat 18 by the force of the fluid exhausting from the end of the cylinder opposite to that which is now connected to the pressure supply.

Thus the piston will be moved under the influence of the pressure from the fluid source as long as the buttons CP—1 and CR—2 are held depressed.

Upon release of the buttons CP—1 and CR—2 all of the parts will be restored to their normal positions and further movement of the piston in the power cylinder will be arrested, the back pressure exerted in the power cylinder by any effort of the piston to move either forwardly or backwardly thereof being transmitted back to the main valves to hold these valves in closed position and prevent creepage of the power piston in either direction.

Similarly, if it is desired to move the power piston in the opposite direction, the simultaneous depression of the buttons CP—2 and CR—1 will cause the main valves 21 and 31 to open, permitting pressure from the pressure source to pass from the pressure port P to the cylinder port C—2 while the exhaust fluid from the cylinder will pass from the cylinder port C—1 to the return port R and the piston will be moved in the new direction until the buttons CP—2 and CR—1 are released.

*Diagram of fluid flow*

Figure 22:
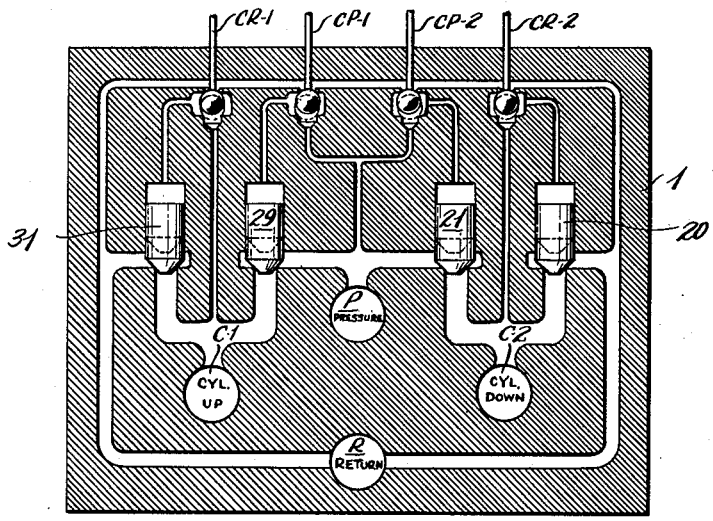
Fig. 22 is a diagrammatic view illustrating the assembly and operation of the pilot valve and main valve structures of the valve shown in Fig. 1.

In Fig. 22 a simplified diagram is illustrated showing in diagrammatic form the fluid flow through my valve for the operation of a power piston as hereinbefore described and which permits the more ready tracing of the operation of the valve assembly.

In Fig. 22 the valve body is illustrated at 1 as having a pressure port P, a return port R, a cylinder port C—1 (bearing the legend "Cyl. Up") and a cylinder port C—2 (bearing the legend "Cyl. Down"). The main control valves 20, 21, 29 and 31 are illustrated as controlling the flow of fluid to and from the cylinder ports C—1 and C—2 and this in turn is being controlled by pilot valve assemblies adapted to be actuated by buttons CP—1, CR—1, CP—2 and CR—2, respectively.

Thus the depression of the button CP—1 permits pressure fluid from the pressure source to be exhausted from above the main valve 29 back to the return port R and allows the pressure from the pressure source P to lift the valve 29 from its seat and to pass the pressure fluid to the cylinder port C—1.

At the same time the depression of the button CR—2 will cause the back pressure from cylinder port C—2 to be exhausted from above the main valve 20 and will allow this valve to be raised from its seat by the back pressure created by the piston attempting to exhaust fluid from the end of the cylinder connected to cylinder port C—2.

The reverse operation may be accomplished by operating the button CP—2 to allow the piston 21 to be pressed from its seat by the pressure fluid and allow the pressure fluid to enter through the cylinder port C—2 while a simultaneous depression of the button CR—1 will permit the fluid exhausting from the opposite end of the cylinder to lift the main valve 31 from its seat and exhaust the fluid from that end of the cylinder to the return port R.

*Manual operation*

As pointed out hereinbefore, the operation of the pilot valve buttons may be accomplished in any manner but it is extremely desirable that a manual operation be provided.

*Adaptation of valve assembly to special applications*

From the foregoing it will be apparent that I have provided a valve assembly in which the essential operating parts are a body member bored to provide a plurality of valve chambers in which are located main control valves and a pilot valve receiving socket, together with a unitary pilot valve assembly which may be constructed as a separate unit and assembled with the body merely by its insertion into the socket and its alignment therein by means of the locating pin 53.

The construction of the body block and its valve chamber bore, together with the various ports which interconnect the ports leading to the pilot valve socket, may be employed as a universal body block for various valve applications merely by the substitution of different pilot valve assemblies in the pilot valve receiving socket.

As described herein, the valve structure is adapted as a 4-way valve for the operation of a power piston in either of two directions and the valve is adapted to hold the piston in any position to which it has been moved without possibility of creeping of the piston while the valve is in its neutral position. The structure as described may be termed a "normally closed" valve in which in the neutral position all of the main valve members are closed.

Special applications may require a change in this type of operation of the main valves, it frequently being desirable to maintain pressure from the fluid source against the power piston when the valve is in its neutral position. Such operation may be readily accomplished merely by the substitution of a different pilot valve assembly.

Figure 23:
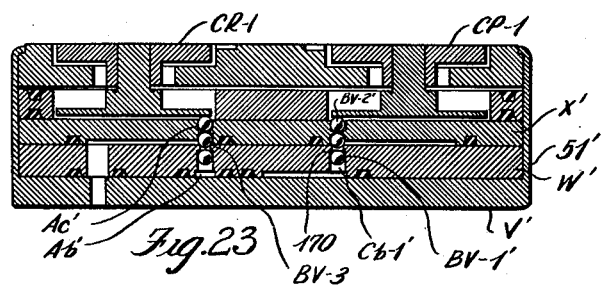
Fig. 23 is a vertical sectional view similar to Fig. 12 but illustrating a modified form of pilot valve structure which may be employed with the valve assembly shown in Figs. 1 through 4.
Figure 24:
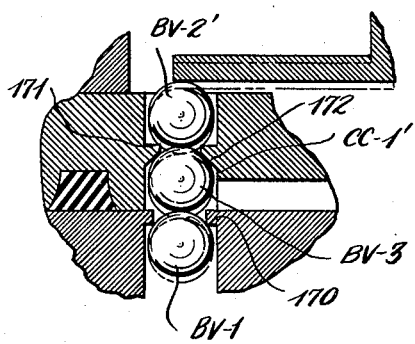
Fig. 24 is an enlarged fragmentary sectional view of the pilot valve assembly shown in Fig. 23.

As shown particularly in Figs. 23 and 24, a pilot valve assembly adapted for this latter purpose would include the pilot valve case 51' identical in all respects with the pilot valve case 51, the lower wall V of which will be provided with ports alignable with the ports in the pilot valve receiving socket 9. The lowermost plate W' of this pilot valve assembly would differ from the lower plate W hereinbefore described only by having the ports Ab' and Cb—1' formed on two diameters to provide a valve seat 170 against which a lower ball valve BV—1' is adapted to be seated under the influence of fluid pressure from the pressure source or back pressure in the power cylinder as distinguished from holding such valve members out of seating relation as was described with reference to Figs. 12 through 20.

The next uppermost disk X' of the pilot valve assembly is provided with ports Cc—1' and Ac' so constructed as to provide a seat 171 for the uppermost ball valve BV—2' and an auxiliary seat 172 for an intermediate ball valve BV—3.

Thus normally the valves in the ports of the pilot valve assembly which control the application of the pressure from the fluid source to the upper sides of the main movable valves 20, 21, 29 and 31 will be closed against their seats 170, allowing fluid from above the main valve members to be exhausted past the valve seat 171 to the return port R in the manner described with reference to Figs. 13 through 20.

Upon depression of the pilot valve buttons CP—1 and CR—1 or CP—2 and CR—2, the main valves will be moved from their normal open positions to closed positions by reason of the lower ball valve member BV—1' being moved away from its seat 170 to permit pressure from the fluid source to be admitted above the main valves while at the same time escape of fluid from above the main valves is prevented by closing of the ball valve members BV—2' against its seat 171.

By providing pilot valve assemblies having various combinations of ball valve assemblies such as the ball valve assemblies illustrated in Fig. 24 controlling one of the main valves to hold such main valve in open position when the valve assembly has been operated to a "neutral" position while others of the ball valve assemblies are as illustrated in Fig. 13, substantially any combination of control may be readily accomplished.

It will therefore be observed that I have provided a valve structure in which a single valve body may be made in stock quantities and may be assembled with its main valve members while a stock of different pilot valve units may be provided to permit the ready selection of any one of the pilot valve units for insertion into any one of the valve bodies to produce a valve control for any particular operation desired by the manufacturer.

It will also be noted that the structure described permits the use of mass produced parts which are not required to be made with extreme accuracy of dimensions since all of the moving parts which cooperate with each other are but loosely dimensioned relative to each other, seals being employed to provide the necessary packing or sealing of the parts relative to each other and without requiring accurate metal to metal fitting of any of the parts.

Figure 4:
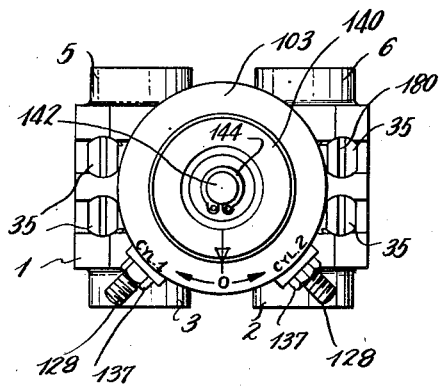
Fig. 4 is a top plan view of the valve shown in Fig. 1.

By referring particularly to Figs. 4 and 6, it will be observed that each of the plugs 35 is provided with a slot 180 adapted to be engaged by a screwdriver to permit the turning of the plug either to its locked or its unlocked position, the slots being so located relative to the cut away portion 38 of the plug that when the plug is in locked position the slots in both of the plugs located at one end of the valve body are in alignment with each other and in alignment with a laterally extending bore 181 through which a wire may be passed to interlock the body and each of the plugs to prevent their inadvertent movement toward an unlocked position during service.

While I have shown and described the preferred embodiment of my invention, I do not desire to be limited to any of the details of construction shown or described herein, except as defined in the appended claims.

I claim:

1. In a valve assembly: a body; a plurality of valve chamber bores extending from the exterior of the body, the longitudinal axes of which are disposed in a single plane and intersecting each other; a valve seat formed in each of said bores between the intersection of said bores and the exterior end thereof; a movable valve member in each of said bores between said end and said seat; a pressure supply port in said body connectible to a pressure supply line and intersecting one of said bores above its seat; an exhaust port in said body connectible to an exhaust line and intersecting another of the bores above its seat; a power device port in said body connectible to a power device to be controlled by said valve members and communicating with said bores below their intersection; a pilot valve socket in said body; a plurality of ports in said body intercommunicating said socket with the pressure supply port, the exhaust port and each of said valve chambers at a point above the movable valve members therein; and a pilot valve unit including a pilot valve for each of said movable valve members in a housing insertable in said socket, said housing having a plurality of ports therein, one alignable with each of the socket ports, whereby the insertion of said unit automatically interconnects said pilot valves and said chambers.

2. In a valve assembly: a body; a plurality of valve chamber bores extending from the exterior of the body, the longitudinal axes of which are disposed in a single plane and intersecting each other; a valve seat formed in each of said bores between the intersection of said bores and the exterior end thereof; a movable valve member in each of said bores between said end and said seat; a pressure supply port in said body connectible to a pressure supply line and intersecting one of said bores above its seat; an exhaust port in said body connectible to an exhaust line and intersecting another of the bores above its seat; a power device port in said body connectible to a power device to be controlled by said valve members and communicating with said bores below their intersection; a pilot valve socket in said body; a plurality of ports in said body intercommunicating said socket with the pressure supply port, the exhaust port and each of said valve chambers at a point above the movable valve members therein; a pilot valve unit including a pilot valve for each of said movable valve members in a housing insertable in said socket, said housing having a plurality of ports therein, one alignable with each of the socket ports, whereby the insertion of said unit automatically interconnects said pilot valves and said chambers; and a seal surrounding each of said socket ports to engage said housing and to seal against escape of fluid between said housing and said socket.

3. In a valve assembly: a body; a plurality of valve chamber bores extending from the exterior of the body, the longitudinal axes of which are disposed in a single plane and intersecting each other; a valve seat formed in each of said bores between the intersection of said bores and the exterior end thereof; a movable valve member in each of said bores between said end and said seat; a pressure supply port in said body connectible to a pressure supply line and intersecting one of said bores above its seat; an exhaust port in said body connectible to an exhaust line and intersecting another of the bores above its seat; a power device port in said body connectible to a power device to be controlled by said valve members and communicating with said bores below their intersection comprising a flat bottomed bore, a pivot valve socket in said body, a plurality of ports in the bottom of said socket and spaced from each other including a first port communicating with said pressure supply port, a second port communicating with said exhaust port, a port for each of said valve chambers communicating with said chambers above the valve therein, and a port communicating with said valve chambers below the valves therein; a pilot valve assembly insertable into said socket and including a pilot valve for each pair of intersecting valve chamber bores for selectively alternatively intercommunicating the pressure supply port and one of the associated valve chamber bores above the valve member and intercommunicating the exhaust port with said valve chamber bore above the valve member; and a pilot valve for each of said pair of intersecting chamber bores for alternatively intercommunicating the power device port and the other of the associated valve chamber bores above the valve member therein and intercommunicating the exhaust port with said valve chamber bore above the valve member.

OTIS C. MARTIN.

REFERENCES CITED

The following references are of record in the file of this patent:

UNITED STATES PATENTS

| Number | Name | Date |
|---|---|---|
| 336,724 | Lamb | Feb. 23, 1886 |
| 926,142 | Schodde | June 29, 1909 |
| 1,083,810 | Engberg | Jan. 6, 1914 |
| 1,140,332 | Brisbois | May 18, 1915 |
| 1,645,628 | Smith | Oct. 18, 1927 |
| 1,722,920 | Hynes | July 30, 1929 |
| 1,930,557 | Hughes | Oct. 17, 1933 |
| 2,275,963 | Herman | Mar. 10, 1942 |
| 2,294,702 | Van Der Werff | Sept. 1, 1942 |
| 2,339,353 | Ray | Jan. 18, 1944 |
| 2,382,245 | McCormack | Aug. 14, 1945 |
| 2,413,757 | Fletcher | Jan. 7, 1947 |